(12) United States Patent  
Kurokawa et al.

(10) Patent No.: US 7,103,043 B2  
(45) Date of Patent: Sep. 5, 2006

(54) PACKET TRANSMISSION APPARATUS

(75) Inventors: Yasushi Kurokawa, Fukuoka (JP); Hideyo Fukunaga, Fukuoka (JP); Takashi Maemoto, Kaho (JP); Yuuki Okumura, Fukuoka (JP)

(73) Assignee: Fujitsu Limited, Kawasaki (JP)

( * ) Notice: Subject to any disclaimer, the term of this patent is extended or adjusted under 35 U.S.C. 154(b) by 864 days.

(21) Appl. No.: 10/078,944

(22) Filed: Feb. 19, 2002

(65) Prior Publication Data

US 2003/0043840 A1 Mar. 6, 2003

(30) Foreign Application Priority Data

Aug. 29, 2001 (JP) .............................. 2001-259904

(51) Int. Cl.  
H04L 12/28 (2006.01)  
H04L 12/56 (2006.01)

(52) U.S. Cl. .................. 370/390; 370/392; 370/432; 370/412; 370/462

(58) Field of Classification Search ................ 370/389, 370/390, 392, 401, 412, 428, 432, 462  
See application file for complete search history.

(56) References Cited

U.S. PATENT DOCUMENTS 6,212,182 B1* 4/2001 McKeown .................. 370/390
6,757,282 B1* 6/2004 Ofek .......................... 370/389
6,816,916 B1* 11/2004 Black et al. .................... 710/5
6,836,481 B1* 12/2004 Hotta ........................ 370/392
2002/0110139 A1* 8/2002 Boura et al. ................ 370/432
2003/0174701 A1* 9/2003 Angle et al. ................ 370/390

FOREIGN PATENT DOCUMENTS

JP 10-145387 5/1998

* cited by examiner

Primary Examiner—Ricky Q. Ngo  
Assistant Examiner—Venkatesh Haliyur  
(74) Attorney, Agent, or Firm—Katten Muchin Rosenman LLP

(57) ABSTRACT

The present invention is directed to the provision of a packet transmission apparatus and, more particularly, to a packet transmission apparatus achieving high-speed processing capability and enhanced relay quality for multicast packets. The packet transmission apparatus comprises: a non-copy packet arbiter which selects one of the non-copy packets by a prescribed algorithm, and requests transmission of the selected non-copy packet; a copy packet arbiter which selects one of the copy packets by a prescribed algorithm, and requests transmission of the selected copy packet; and a final arbiter which selects either one of the transmit requests, the transmit request from the non-copy packet arbiter or the transmit request from the copy packet arbiter, by a prescribed algorithm, and requests transmission of the selected packet, and wherein: the packet transmission apparatus transmits the packet requested by the final arbiter for transmission.

1 Claim, 10 Drawing Sheets

PRIOR ART

Fig.1

| | PACKET LENGTH | PACKET SPACING (NUMBER OF CLOCKS) | TRANSMISSION SPEED |
|---|---|---|---|
| EXAMPLE 1 | 54byte | 0 (NO SPACING) | 12.8Gbps |
| EXAMPLE 2 | 54byte | 40 | 0.98Gbps |
| EXAMPLE 3 | 1500byte | 40 | 9.0Gbps |
| EXAMPLE 4 | 1500byte | 1100 | 1.0Gbps |
| EXAMPLE 5 | 54byte | 1100 | 0.04Gbps |

Fig.6

| REGISTER SET VALUE | LENGTH 64byte Gap(clks) | CLK 4 G/Mbps | REMARKS |
|---|---|---|---|
| 0 | 0 | 10.24 | Gbps |
| 1 | 4 | 5.69 | Gbps |
| 2 | 8 | 3.94 | Gbps |
| 3 | 16 | 2.44 | Gbps |
| 4 | 32 | 1.38 | Gbps |
| 5 | 64 | 0.74 | Gbps |
| 6 | 128 | 0.38 | Gbps |
| 7 | 256 | 0.20 | Gbps |
| 8 | 512 | 99.03 | Mbps |
| 9 | 1024 | 49.76 | Mbps |
| 10 | 2048 | 24.94 | Mbps |
| 11 | 4096 | 12.48 | Mbps |
| 12 | 8192 | 6.25 | Mbps |
| 13 | 16384 | 3.12 | Mbps |
| 14 | 32768 | 1.56 | Mbps |
| 15 | 65536 | 0.78 | Mbps |

Fig.8A

| ADDRESS | 3 | 2 | 1 | 0 |
|---|---|---|---|---|
| bit 0-15 | | | | |
| bit 15-31 | | | | |
| bit 32-47 | | | | |
| bit 48-63 | | | ○ | |

Fig.8B

| MUX COMMAND | DESCRIPTION |
|---|---|
| 00 | NOTHING IS DONE |
| 01 | DELETE AREA ○ |
| 10 | ADD REWRITE DATA AFTER AREA ○ |
| 11 | OVERWRITE AREA ○ WITH REWRITE DATA |

PACKET TRANSMISSION APPARATUS

BACKGROUND OF THE INVENTION

1. Field of the Invention

The present invention relates to a packet transmission apparatus, and more particularly to a packet transmission apparatus achieving high-speed processing capability and enhanced relay quality for multicast relay packets. The use of such packets has been rapidly increasing with the widespread use of the Internet in recent years.

2. Description of the Related Art

With the improvements that have been made in the packet processing capabilities of packet transmission apparatuses in recent years, transmission of packets having longer packet lengths than before has become possible. On the other hand, to achieve efficient packet transmission, the transmission speed of packets from the packet transmission apparatus must be matched to that of the transmission line over which the packets are transmitted.

For this purpose, it has been practiced to transmit relay packets at predetermined intervals or control packet transmission spacing by measuring relay packets over a long span, in order to achieve improvements in the packet processing capability and relay quality of the packet transmission apparatus. The packet transmission speed here refers to the number of bits of packets transmitted per second (bps).

In the case of fixed-length packets, efficient packet transmission can be achieved by determining the packet spacing according to the packet length and line speed, because the transmission speed can be maintained constantly at a value close to the line speed even if the packets are transmitted at predetermined intervals.

However, in the case of variable-length packets, as the packet transmission speed (the number of bits of packets transmitted per second) of the packet transmission apparatus varies depending on the packet length, there has been the problem that the difference between the line speed and the transmission speed becomes large, degrading the packet relay performance of the packet transmission apparatus as well as the packet relay quality. Furthermore, when controlling the packet transmission spacing to match the line speed by measuring the transmitted packets, circuitry having a function equivalent to that of a conventional transmit request unit becomes necessary, resulting in the problem that the amount of circuitry increases correspondingly.

FIG. 1 is a diagram showing examples of packet transmission spacing control in a packet transmission apparatus.

In FIG. 1, it is assumed that the packet transmission apparatus has a packet data bus speed of 12.8 Gbps (bus clock of 100 MHz, bus width of 128 bits), and that the line speed is 1 Gbps. Examples 1 and 2 show examples of transmission spacing control for fixed-length packets, and examples 3 to 5 concern examples of transmission spacing control for variable-length packets.

Example 1 shows the case in which 54-byte fixed-length packets are transmitted with no spacing in between (packet spacing "0"); in this case, the packet transmission speed is 12.8 Gbps and far exceeds the line speed of 1 Gbps. Therefore, in example 2, in order to match the packet transmission speed to the line speed, the packet transmission spacing is controlled to 40 clocks, thereby achieving a packet transmission speed of 0.98 Gbps which is close to the line speed.

In example 3, 1500-byte variable-length packets are transmitted with the packet transmission spacing of 40 clocks; in this case, the packet transmission speed is 8.9 Gbps and far exceeds the line speed. Therefore, in example 4, the packet transmission spacing for 1500-byte variable-length packets is increased to 1100 clocks to make the packet transmission speed match the line speed of 1 Gbps. In this case, if 54-byte variable-length packets are transmitted with the spacing of 1100 clocks, as shown in example 5, the packet transmission speed is 0.04 Gbps falling far short of the line speed.

In this way, packet transmission spacing control for variable-length packets is difficult compared with that for fixed-length packets, the former having the problem that if the packet transmission speed exceeds the line speed, some of the transmit packets will be discarded at the line interface, etc. of the packet transmission apparatus, resulting in degradation of packet relay quality, and conversely, if the packet transmission speed is slower than the line speed, this will also degrade the packet relay quality.

FIG. 2 is a diagram showing one example of multicast packet processing in a prior art packet transmission apparatus.

In the packet transmission apparatus, arbitration for an outgoing channel (outgoing port), the order of transmission, etc. is done among a plurality of packets to be transmitted. It is assumed here that packet A is a multicast packet that has a plurality of destinations and whose copies are transmitted to channel 0. It is also assumed that packet B is an ordinary packet, with no copies, that has one destination and is transmitted to channel 1.

As the result of arbitration, in the illustrated example, first the packet A is transmitted out for channel 0, and then the packet B is transmitted out for channel 1. In this case, the packet B for channel 1 is transmitted out after all the copies of the packet A have been transmitted out. This means that during the time that the copy packets for channel 0 are being transmitted out preferentially, the packet for channel 1 cannot be transmitted.

Since the presence or absence of copy packets to be transmitted is not considered in determining the packet transmission order, the prior art arbitration has had the problem that packet relay to a particular channel is interrupted for a finite period, as described above. Therefore, in a network where such preferential transmission of copy packets is not desired, the problem has been that relay line quality for a particular channel degrades because of transmission of such copy packets.

Furthermore, since, in the prior art, the transmit request unit simply performs packet transmission spacing control on a particular destination channel or between destination channels, the prior art has had the problem that when copy packets occur for one outgoing port, the transmission spacing of the copy packets cannot be controlled.

FIG. 3 is a diagram showing one example of packet add/delete operations in a prior art packet transmission apparatus.

As shown in FIG. 3, in the prior art, the bit width of the packet data bus is 32 bits, and the addition or deletion of a packet is also performed in units of 32 bits. As a result, the addition of a new packet (DN) can be accomplished by just reading the same address data (D3) on a 32-bit wide FIFO twice, and similarly, the deletion of a packet can be accomplished by skipping the reading of particular address data (D3) and thereby deleting the designated address area.

In this way, in the prior art, since the bit width of the packet bus is small, and since the minimum area that needs packet addition or deletion is not divided into smaller areas, it has been possible to readily add or delete the designated area by just controlling the FIFO address. However, with increasing processing speeds in recent years, the bit width of the packet bus has been increasing beyond 32 bits, and besides, there is a tendency that the add/delete area is divided into smaller areas, for example, 16 bits wide; this has given rise to the problem that, with the prior art simple processing method, it is difficult to add or delete packets.

SUMMARY OF THE INVENTION

In view of the above-outlined problems, it is an object of the present invention to provide packet transmission spacing control that can achieve the packet transmission speed and line quality that match the line speed even when transmitting variable-length packets by multicasting, and a packet transmission apparatus that performs arbitration for the same.

It is another object of the present invention to provide the packet transmission apparatus with the capability to perform the addition and deletion of packets at higher speed and in smaller units.

According to the present invention, there is provided a packet transmission apparatus comprising: a non-copy packet arbiter which selects one of the non-copy packets by a prescribed algorithm, and requests transmission of the selected non-copy packet; a copy packet arbiter which selects one of the copy packets by a prescribed algorithm, and requests transmission of the selected copy packet; and a final arbiter which selects either one of the transmit requests, the transmit request from the non-copy packet arbiter or the transmit request from the copy packet arbiter, by a prescribed algorithm, and requests transmission of the selected packet, and wherein: the packet transmission apparatus transmits the packet requested by the final arbiter for transmission.

The copy packet arbiter determines packet transmission spacing based on the packet length of the copy packet and on-line speed, and the copy packet is transmitted based on the packet transmission spacing.

The packet transmission apparatus further comprises: a buffer unit which stores packet data in a memory constructed by arranging a plurality of memory areas, each memory area having a bit width equal to the smallest bit width with which to perform processing for altering the packet data; and a MUX unit which applies an alteration to the packet data supplied from the buffer unit, on a memory area by memory area basis by rearranging the memory areas, and wherein: the packet transmission apparatus transmits the packet requested by the final arbiter for transmission and altered by the MUX unit.

BRIEF DESCRIPTION OF THE DRAWINGS

The present invention will be more clearly understood from the description as set forth below with reference to the accompanying drawings.

FIG. 1 is a diagram showing examples of packet transmission spacing control in a packet transmission apparatus.

FIG. 6 is a diagram showing one example of a packet transmission spacing calculation.

FIG. 8A is a diagram (1) for explaining the control operation of an MUX unit according to the present invention.

FIG. 8B is a diagram (2) for explaining the control operation of the MUX unit according to the present invention.

DESCRIPTION OF THE PREFERRED EMBODIMENTS

Figure 4:
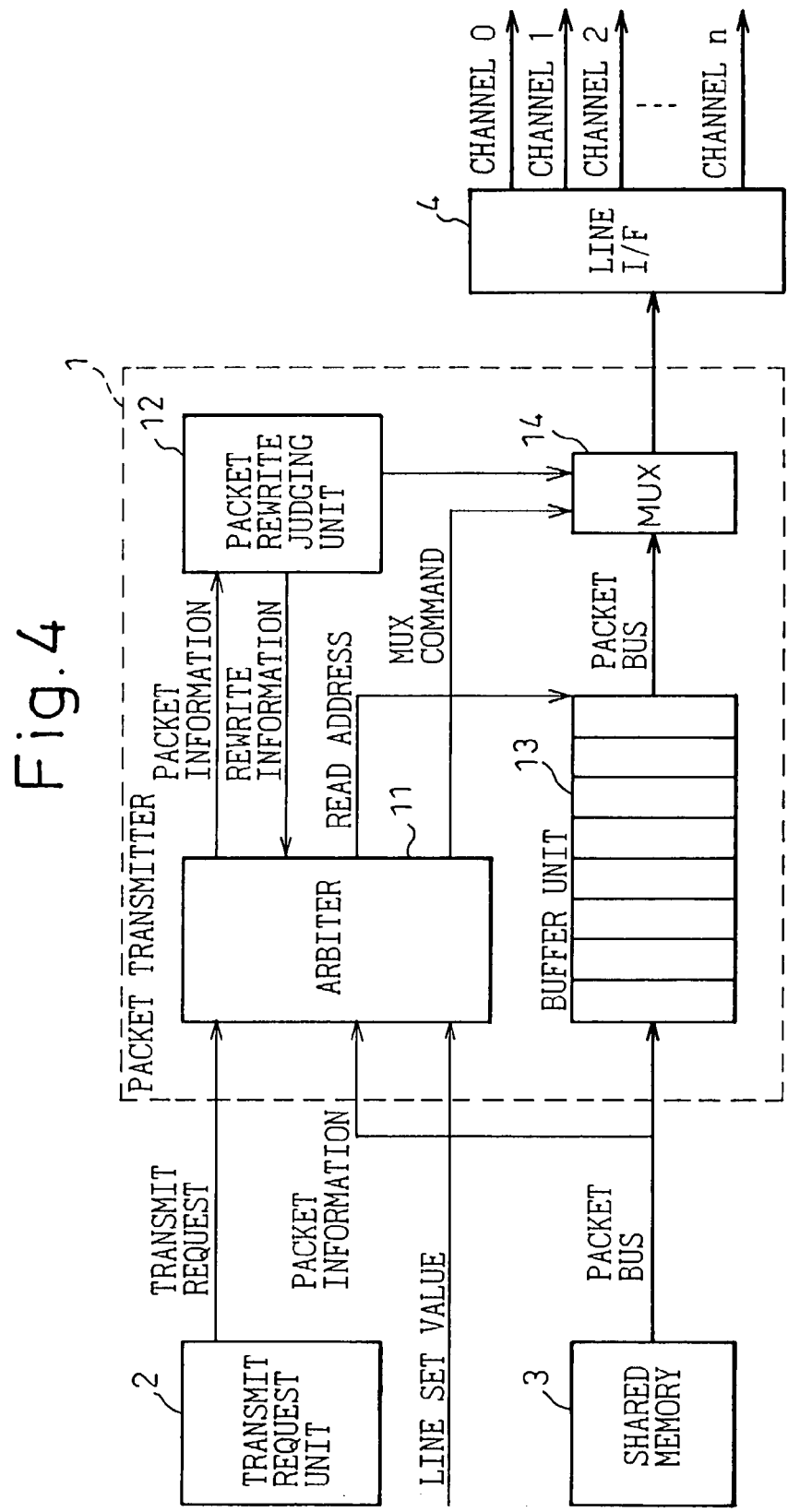
FIG. 4 is a diagram showing the basic configuration of a packet transmission apparatus according to the present invention.

FIG. 4 is a diagram showing the basic configuration of a packet transmission apparatus according to the present invention.

In FIG. 4, a transmit request unit 2 selects the packet to be transmitted next from among the packets stored in a shared memory 3 and ready for transmission, and sends a transmit request to a packet transmitter 1.

In the packet transmitter 1, an arbiter 11 receives the transmit request and the selected packet data that is output from the shared memory 3 with the same timing as the transmit request, and writes the packet data to a transmit buffer unit 13 based on the packet information such as destination channel and packet length extracted from the packet data, while holding, in itself, the packet information such as destination channel, presence or absence of copy, and packet length.

The arbiter 11 arbitrates the transmission order of transmit packets by selecting from among the packets requested for transmission the packet to be transmitted next by considering the destination channel and the presence or absence of copy. When generating copy packets for a multicast packet or the like, the arbiter 11, after transmitting the first packet, temporarily excludes the subsequent copy packets from the list of packets to be transmitted.

Then, a timer value for controlling the transmission spacing for the next copy packet is calculated based on the line set value and the packet length, and the timer value is loaded into an internal counter to start decrementing the value. When the timer value reaches zero, the next copy packet is selected for transmission. The subsequent copy packets are sequentially selected for transmission in like manner.

Figure 2:
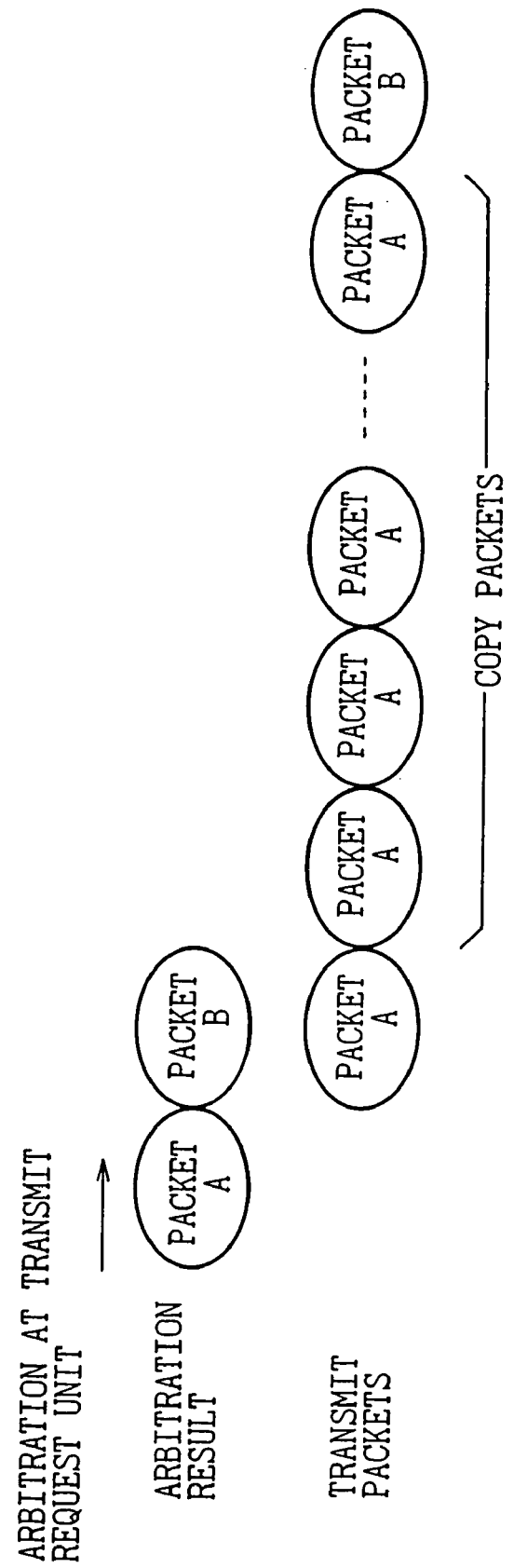
FIG. 2 is a diagram showing one example of multicast packet processing in a prior art packet transmission apparatus.
Figure 3:
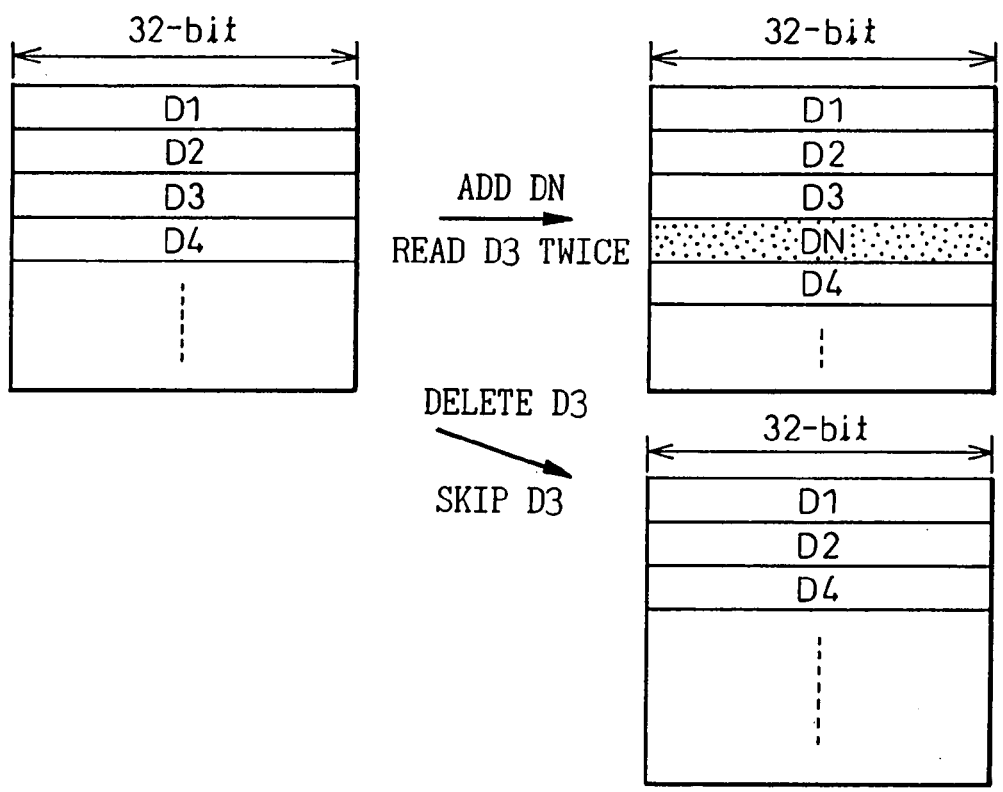
FIG. 3 is a diagram showing one example of packet add/delete operations in a prior art packet transmission apparatus.

In this way, in the present invention, when generating copy packets, the arbiter 11 calculates the packet spacing based on the line set value and the packet length, and transmits the packets with the thus calculated packet spacing; as a result, the transmission speed can be maintained at a value close to the line speed even when transmitting multicast packets, and degradation in transmission performance and quality can thus be prevented Further, as will be described later in the embodiment shown in FIG. 5, when temporarily excluding the subsequent copy packets from the list of packets to be transmitted, the arbiter 11 arbitrates the transmission order of copy packets separately from the transmission order of non-copy packets, and then arbitrates between the results of the respective arbitrations; as a result, fair arbitration between copy packets and non-copy packets can be achieved. This overcomes the problem shown in FIG. 2 that the next transmit packet B cannot be transmitted until all the copy packets A have been transmitted out.

A packet rewrite judging unit 12 receives the packet information from the arbiter 11, and returns rewrite information, including read address information of the buffer unit 13, to the arbiter 11, while transferring the rewrite data to a MUX (Multiplexing) unit 14. The buffer unit 13, which stores packet data, is constructed from a memory, for example, a FIFO (First In First Out) memory, that is constructed by arranging a plurality of memory areas, each memory area having a bit width equal to the smallest bit width with which to perform packet rewriting.

In accordance with a MUX command from the arbiter 11 and the rewrite data from the packet rewrite judging unit 12, the MUX unit 14 adds, deletes, or rewrites the packet data read from the buffer unit 13. When adding or rewriting an area, the rewrite data from the packet rewrite judging unit 12 is written over that area, and the areas are rearranged. When deleting an area, the area to be deleted is overwritten with the next area, and the subsequent areas are rearranged. A line interface (line I/F) 4 converts the parallel data from the MUX unit 14 into serial data which is output as a channel signal on the corresponding channel.

By constructing the buffer unit 13 from a plurality of memory areas each having a bit width equal to the smallest bit width with which to add or delete a packet area, and by providing the MUX unit 14 with the function of rearranging the packet areas, as described above, the packet data bus width can be made larger than the smallest bit width with which to add or delete a packet area, and as a result, the speed of packet transmission processing can be increased.

Figure 5:
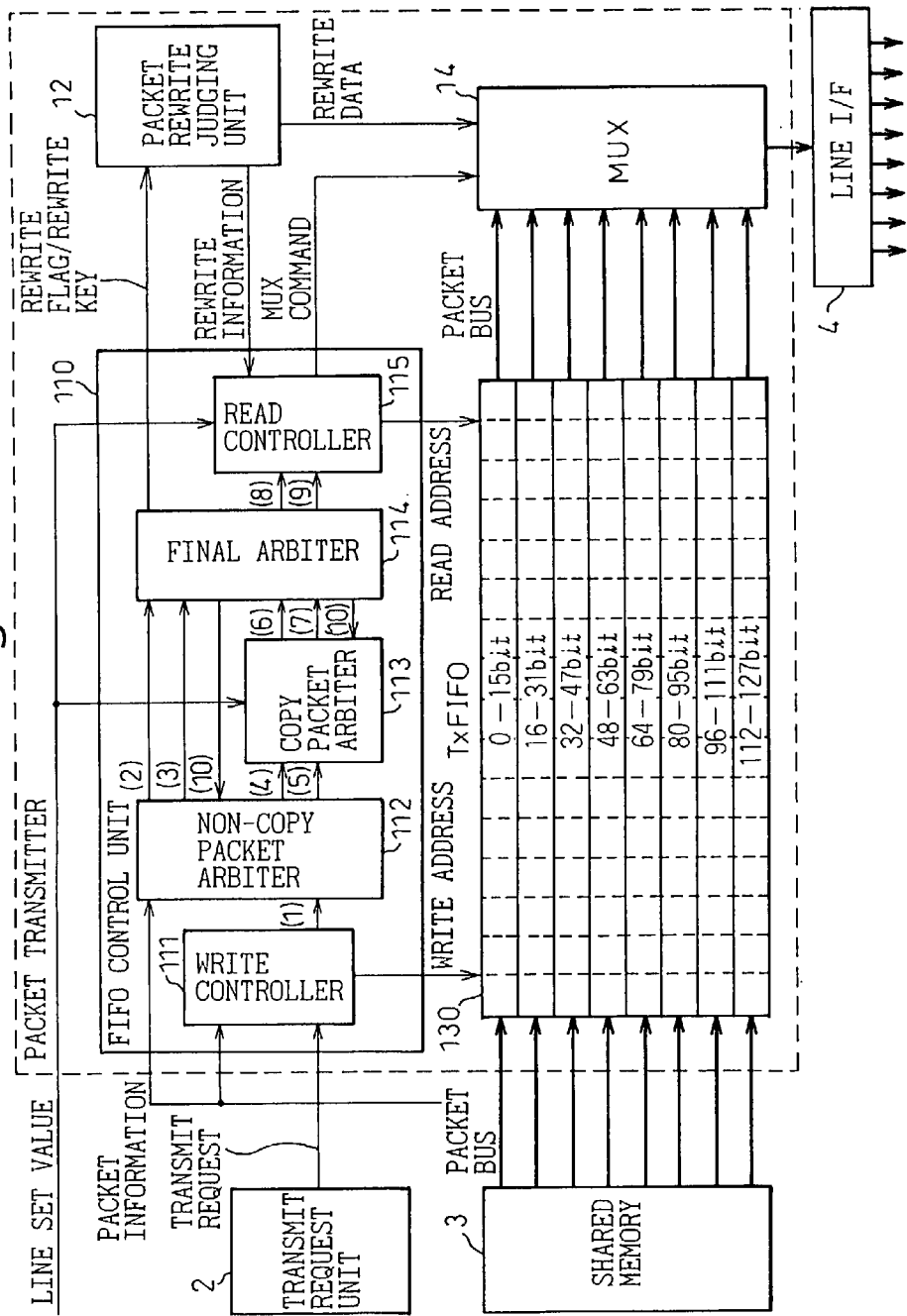
FIG. 5 is a diagram showing one embodiment of a packet transmission apparatus according to the present invention.

FIG. 5 is a diagram showing one embodiment of a packet transmission apparatus according to the present invention.

In FIG. 5, if there is a packet stored in the shared memory 3 and ready for transmission, the transmit request unit 2 sends a transmit request to a write controller 111 in a FIFO control unit 110. With the same timing, the packet data is output from the shared memory 3 onto a 64-bit wide packet bus. Each packet in the shared memory 3 carries prescribed packet information which includes destination channel, packet length, copy flag, rewrite flag, rewrite key, etc.

The write controller 111 that received the transmit request extracts the destination channel and packet length from the packet data, and writes the packet data up to a length equal to the packet length into the corresponding channel area in a Tx FIFO 130. When the write is completed, the write controller 111 sends a write completion signal (1) to a non-copy packet arbiter 112. Upon receiving the write completion signal (1), the non-copy packet arbiter 112 extracts the packet information, consisting of destination channel, packet length, copy flag, rewrite flag, and rewrite key, from the packet data on the packet bus, stores these pieces of information, and increments by 1 a corresponding one of the counters provided within the non-copy packet arbiter 112 for the respective destination channels. When this counter indicates a value of 1 or larger, it is determined that a transmit request(s) is waiting to be served.

Thereafter, the non-copy packet arbiter 112 selects the packet requested for transmission next, on a round robin basis while monitoring the destination channel of each packet for which the transmit request is waiting to be served. Next, the non-copy packet arbiter 112 sends the transmit request (2) of the selected packet to a final arbiter 114 together with the previously stored various pieces of information (3) consisting of destination channel, packet length, rewrite flag, and rewrite key.

On the other hand, if the non-copy packet arbiter 112 that received a transmit select signal (10) from the final arbiter 114 determines the packet to be a copy packet from its copy flag, as will be described later, the non-copy packet arbiter 112 sends a transmit request (4), the same one as above, to a copy packet arbiter 113 together with the various pieces of information (5) consisting of destination channel, packet length, rewrite flag, and rewrite key.

When the transmit request (4) is received, the copy packet arbiter 113 examines the destination channel carried in the received information (5), and increments by 1 a corresponding one of the counters provided within the copy packet arbiter 113 for the respective destination channels. When this counter indicates a value of 1 or larger, it is determined that a transmit request(s) is waiting to be served.

The copy packet arbiter 113 further includes packet transmission spacing control timers, one for each destination channel, and while monitoring every destination channel for which the transmit request is waiting to be served and for which the packet transmission spacing control timer value is zero, the copy packet arbiter 113 selects the packet to be transmitted next on a round robin basis from among such destination channels. In this case, the packet transmission spacing for the selected packet is obtained by calculation from the packet length and the line set value stored in a register. Next, the transmit request (6) of the selected channel is sent to the final arbiter 114 together with the previously stored various pieces of information (7) consisting of destination channel, packet length, rewrite flag, and rewrite key.

FIG. 6 shows one example of the packet transmission spacing calculation.

The packet transmission spacing is obtained from the packet length and the line set value stored in a register. In the illustrated example, line set values 0 to 15 are set using a 4-bit register. Denoting this value as n and the packet length as L bytes, the packet spacing expressed in number of clocks (clks) is calculated as $$G=(L/4)\times 2^{(n-1)} \qquad (1)$$

Here, L/16 indicates that the packet bus is 128 bits (16 bytes) wide, and when n=0, G=0 (no spacing between packets) which is an exceptional case. As one example of the calculation using the above equation (1), FIG. 6 shows the relationships among line set value, packet spacing (Gap), and transmission speed (G/bps) when the packet length is 64 bytes. For a non-copy packet, the above calculation need not be performed in the non-copy packet arbiter 112 as a packet spacing calculation similar to the above is done in the transmit request unit 2.

The final arbiter 114 receives the transmit requests (2) and (6) from the non-copy packet arbiter 112 and the copy packet arbiter 113, respectively, and selects the packet to be transmitted next on a round robin basis by examining the destination channels of the information (3) and (7) received from the respective arbiters. Then, the final arbiter 114 sends the rewrite flag and rewrite key information of the selected packet to the packet rewrite judging unit 12 and, at the same time, passes the destination channel and packet length information (9) of the selected packet to a read controller 115.

Next, the final arbiter 114 returns the transmit select signal (10) to the arbiter 112 or 113 that sent the transmit request of the selected packet. When the sender of the request is the non-copy packet arbiter 112, upon receiving the transmit select signal (10) from the final arbiter 114 the non-copy packet arbiter 112 refers to the copy flag of the packet and, if the packet is a copy packet, sends the transmit request (4) and packet information (5) to the copy packet arbiter 113 and thereafter decrements the corresponding packet counter by 1. If the packet is a non-copy packet, its associated packet counter is simply decremented by 1.

On the other hand, when the copy packet arbiter 113 has received the transmit select signal (10) from the final arbiter, if the packet is not the last packet copy, the copy packet arbiter 113 reloads the value of the packet transmission spacing control timer for the corresponding channel, and resumes decrementing the timer. If the packet is the last copy, its associated packet counter is decremented by 1.

Figure 7:
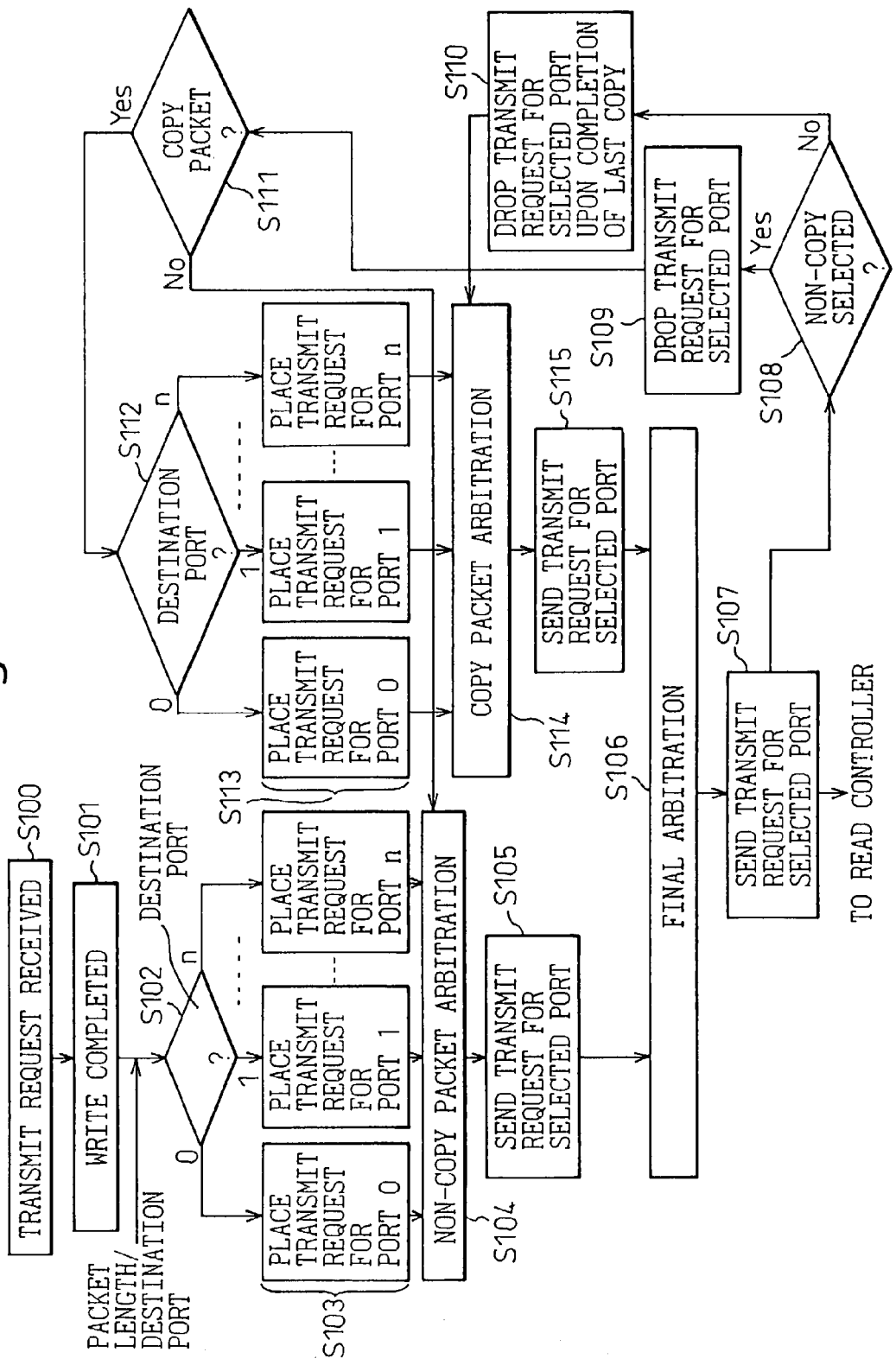
FIG. 7 is a flow chart illustrating an arbitration process performed in a FIFO control unit.

The above-described arbitration process performed in the FIFO control unit 110 is shown in flowchart form in FIG. 7.

When a transmit request is received from the transmit request unit 2 (S100), the write controller 111 reads the requested packet from the shared memory 3 and writes it to the Tx FIFO 130 (S101). For the first transmit packet, the non-copy packet arbiter 112 that received the write completion signal from the write controller 111 increments by 1 the counter associated with the designated one of the destination channels 0 to n (ports 0 to n), and places the transmit request for that channel (S102 and S103). Next, the non-copy packet arbiter 112, while monitoring the destination channels, selects a particular destination channel by arbitrating on a round robin basis, and sends the transmit request for the selected destination channel to the final arbiter 114 (S104 and S105).

The final arbiter 114 then passes the transmit request for the selected destination channel to the read controller 115 (S107), and thereafter returns a transmit select signal to the sender of the transmit request (S108). When the sender of the transmit request is the non-copy packet arbiter 112, the counter associated with the selected destination channel is decremented by 1 and the transmit request is dropped (S109). Further, it is determined whether the copy flag of the packet indicates a copy packet (S111).

If the packet is a non-copy packet, the processing by the non-copy packet arbiter 112 is terminated as long as that packet is concerned (S104); on the other hand, if the packet is a copy packet, the transmit request is passed to the copy packet arbiter 113. The copy packet arbiter 113 that received the transmit request increments by 1 the counter associated with the designated one of the destination addresses 0 to n (ports 0 to n), and places the transmit request for that address (S112 and S113). Next, the copy packet arbiter 113, while monitoring the destination addresses, selects a particular destination address by arbitrating on a round robin basis, and sends the transmit request for the selected destination address to the final arbiter 114 (S114 and S115).

For transmission of the second and subsequent packets, the final arbiter 114 selects either one of the transmit requests (S105 and S116) by arbitrating on a round robin basis (S106), and returns the transmit select signal to the sender of the transmit request after passing the transmit request for the selected destination address to the read controller 115 (S107 and S108). When the sender of the transmit request is the copy packet arbiter 113, the copy packet arbitration described above is repeated until the last packet copy is completed, and upon completion, the counter associated with the selected destination channel is decremented by 1 and the transmit request is dropped (S110 and S114).

In the copy packet arbitration, the packet transmission spacing is calculated as earlier described, and the packet transmission spacing control timer for implementing it is used. As a result, not only can the packet transmission speed be maintained at a value close to the line speed even when transmitting variable-length packets by multicasting, but arbitration between copy packets and non-copy packets is done fairly, thus eliminating the prior art problem that continuous transmission of successive copy packets causes quality degradation of the packets waiting to be transmitted next.

Turning back to FIG. 5, the packet rewrite judging unit 12 receives the rewrite flag and rewrite key and, if the rewrite flag indicates a rewrite, recovers the rewrite information and rewrite data carried in a prescribed format in the rewrite key. The packet rewrite judging unit 12 sends the rewrite information to the read controller 115 and the rewrite data to the MUX unit 14.

The read controller 115 generates a read address in the Tx FIFO 130 from the destination channel information (9) received from the final arbiter 114 and the rewrite information received from the packet rewrite judging unit 12, and starts reading the corresponding packet data; at the same time, a MUX command specifying the contents to be added, deleted, or rewritten, etc. is sent to the MUX unit 14.

The MUX unit 14, based on the MUX command from the read controller 115, identifies the packet area to be rewritten and the contents of the rewrite and performs processing such as overwriting the designated data with the rewrite data received from the packet rewrite judging unit 12, and thereafter sends the parallel-to-serial converted data to the line I/F 4. The line I/F 4 outputs the serial data onto the designated one of the channels 0 to n.

FIGS. 8A and 8B and FIGS. 9 and 10 are diagrams illustrating an example of the control operation of the MUX unit according to the present invention.

In the example of FIG. 8A, the Tx FIFO 130 is shown as having a 64-bit width (bits 0 to 63) to facilitate understanding of the MUX operation (the packet bus is also 64 bits wide). In this example, the Tx FIFO 130 is constructed by arranging a plurality of FIFOs each having a bit width (64 bits) constituting a sub-area that may be designated as the smallest packet area to be added or deleted, and the MUX unit 14, not shown here, is provided with the function of rearranging the sub-areas.

FIG. 8B shows an example of the MUX command. The following description deals with an example in which a packet delete MUX command (01) and a packet add MUX command (10) are applied to a sub-area (indicated by "0") consisting of 16 bits of bits 48 to 63 at Tx FIFO address 1 shown in FIG. 8A.

Figure 9:
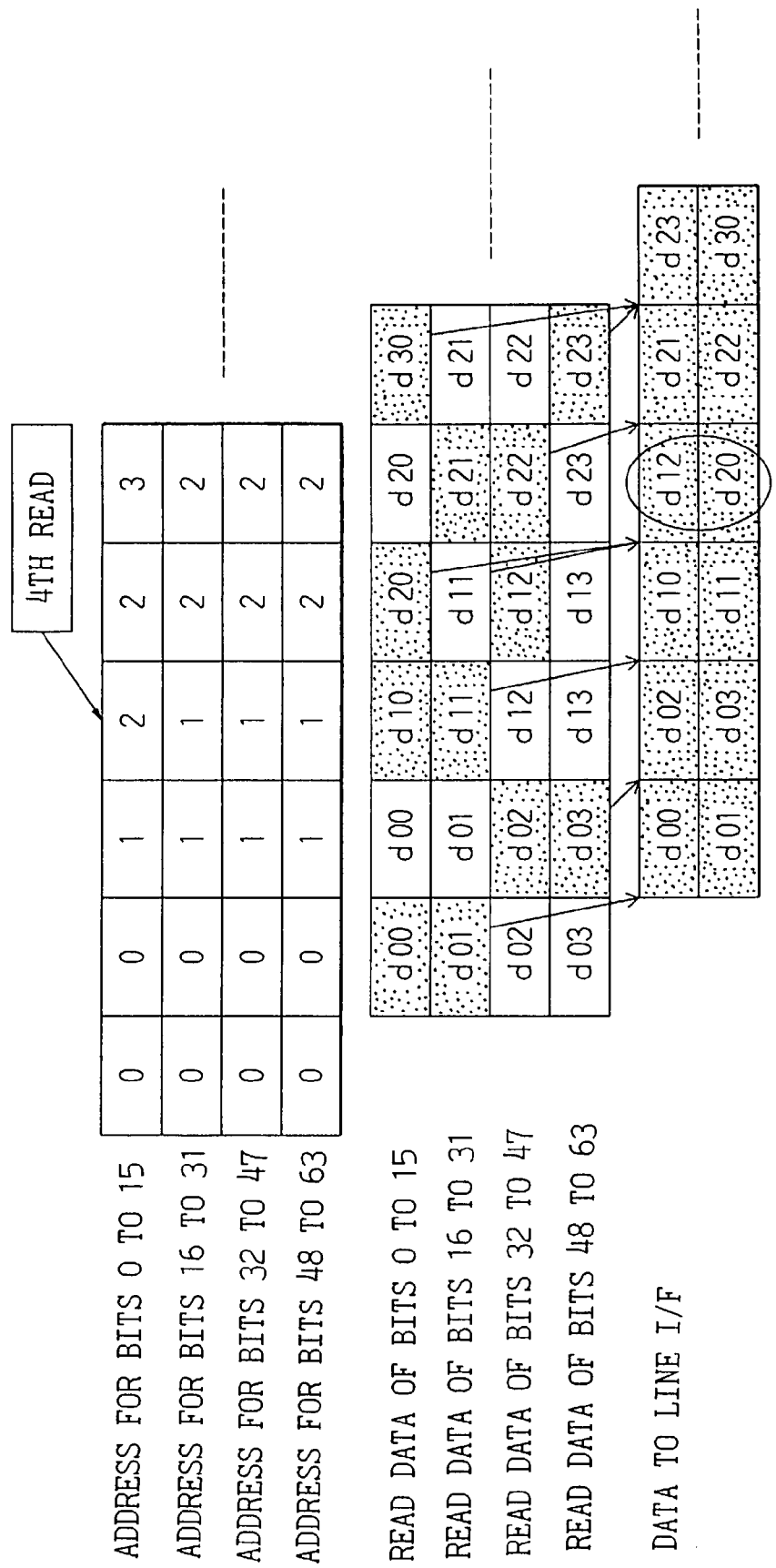
FIG. 9 is a diagram (3) for explaining the control operation of the MUX unit according to the present invention.

FIG. 9 is a diagram showing one example of the MUX operation when deleting a packet.

First, the read controller 115 receives the transmit request (8) and packet length information (9) from the final arbiter 114, and starts reading the data from the Tx FIFO 130 (FIG. 8A) by transmitting the corresponding read address. As shown in the top part of the figure, the read controller 115 can address sub-areas each of 16 bits for each of the addresses 0, 1, . . . , and the read controller 115 performs two read operations on each of the addresses 0, 1, . . .

In the illustrated example, the read controller 115 recognizes the sub-area to be deleted by examining the rewrite information and, when reading the address 1 for the second time, that is, when performing the fourth read operation, the read controller 115 sets the sub-area address for bits 0 to 15 to "2", not "1", and gives an instruction to select d20 and d12 by using the MUX command "01" shown in FIG. 8B. The middle part of the figure shows the data that have been read by the above-described addressing and the bottom part of the figure shows the data train rearranged into 32-bit wide data by the MUX command "01" in the MUX unit 14 for output to the line I/F 4. More specifically, the sub-areas indicated by halftone dots in the middle part of the figure are selectively concatenated in sequence, to generate the data train with d13, the designated sub-area, deleted as shown in the bottom part of the figure.

Figure 10:
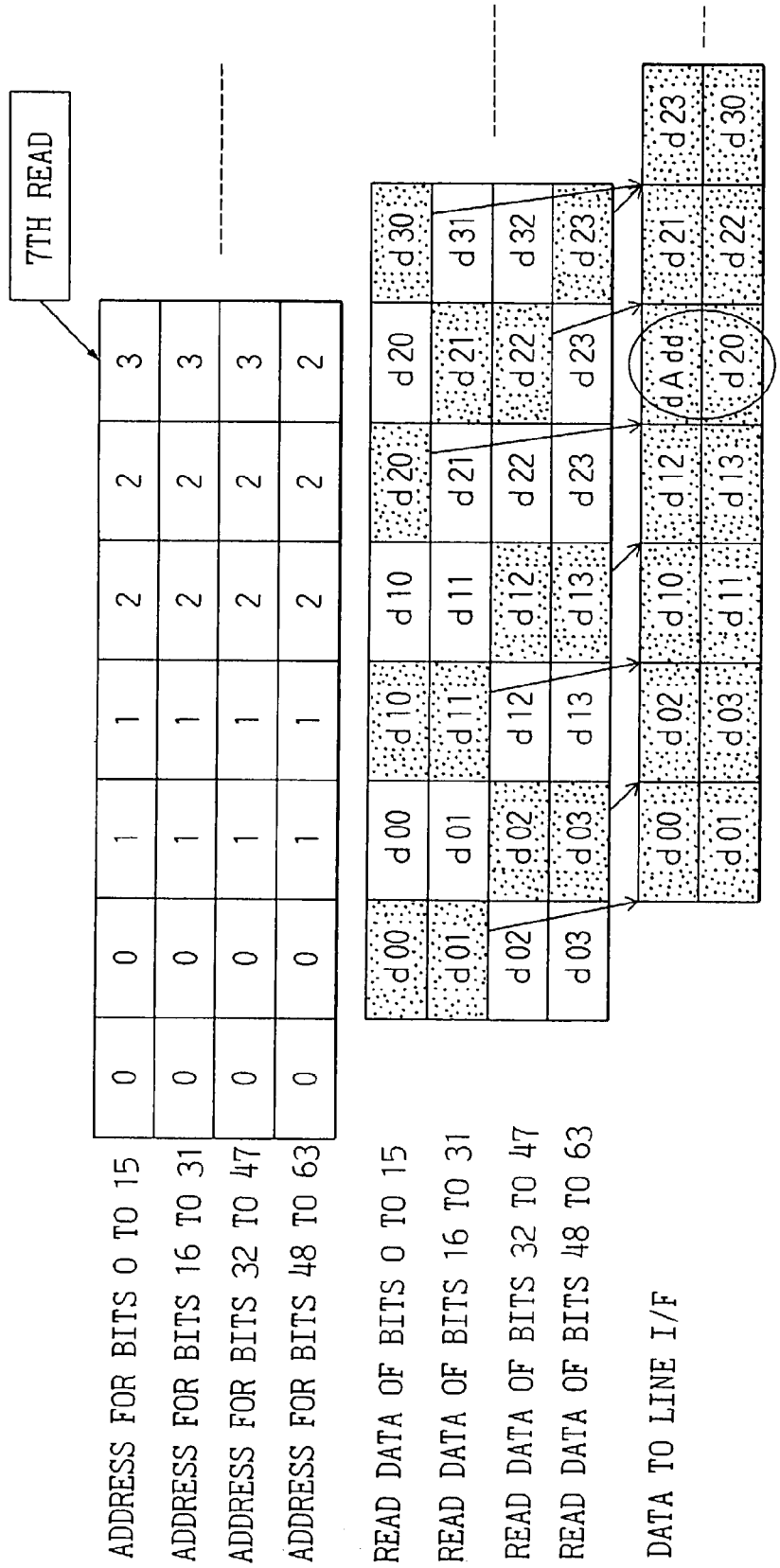
FIG. 10 is a diagram (4) for explaining the control operation of the MUX unit according to the present invention.

FIG. 10 is a diagram showing one example of the MUX operation when adding a packet.

In this case also, the read controller 115 receives the transmit request (8) and packet length information (9) from the final arbiter 114, and starts reading the data from the Tx FIFO 130 (FIG. 8A) by transmitting the corresponding read address. As in the case of FIG. 9, the read controller 115 can address sub-areas each of 16 bits for each of the addresses 0, 1, . . . , and the read controller 115 performs two read operations on each of the addresses 0, 1, . . .

In the illustrated example, the read controller 115 recognizes the sub-area to be deleted by examining the rewrite information, and when performing the seventh read operation, the read controller 115 sets the sub-area address for bits 48 to 63 to "2", not "3", and gives an instruction to select d20 and dAdd by using the MUX command "10" shown in FIG. 8B. The middle part and the bottom part of the figure show the data trains corresponding to those shown in FIG. 9. In the example shown here, the sub-areas indicated by halftone dots in the middle part of the figure are selectively concatenated in sequence, to generate the data train with aAdd added after d13 as shown in the bottom part of the figure.

In this way, according to the present invention, since the Tx FIFO 130 is constructed by arranging a plurality of FIFOs each having a bit width constituting a sub-area that may be designated as the smallest packet area to be added or deleted, and the MUX unit 14 is provided with the function of rearranging the sub-areas, not only can the area to be added or deleted with a bit width equal to the packet bus be formed flexibly, but rearranging by hardware also becomes possible; therefore, the configuration can easily and flexibly accommodate future increases in packet transmission speed expected to be achieved using a wider packet bus.

As described above, according to the present invention, the packet transmission speed can be maintained at a value close to the line speed even when copying variable-length packets for transmission, and besides, arbitration between copy packets and non-copy packets can be done fairly.

Furthermore, according to the present invention, extensions of packet bus width can be easily and flexibly accommodated, and packet copy and packet rewrite operations can be performed at high speed.

The invention claimed is:

1. A packet transmission apparatus comprising:
   a buffer unit which stores packet data in a memory constructed by arranging a plurality of memory areas, each memory area having a bit width equal to the smallest bit width with which to perform processing for altering the packet data;
   a non-copy packet arbiter which selects one of non-copy packets stored in the buffer unit by a prescribed algorithm, and requests transmission of the selected non-copy packet;
   a copy packet arbiter which selects one of copy packets stored in the buffer unit by a prescribed algorithm, and requests transmission of the selected copy packet, said copy packet arbiter determining packet transmission spacing based on the packet length of the copy packet and on line speed, and transmitting the selected copy packet based on the packet transmission spacing;
   a final arbiter which selects either one of the transmit requests, the transmit request from the non-copy packet arbiter or the transmit request from the copy packet arbiter, by a prescribed algorithm, and requests transmission of the selected packet; and
   a MUX unit which applies an alteration to the packet data supplied from the buffer unit, on a memory area by memory area basis by rearranging the memory areas, said packet transmission apparatus transmitting out the packet requested by the final arbiter and altered by the MUX unit for transmission.

* * * * *